US008885169B2

(12) United States Patent
Boura

(10) Patent No.: US 8,885,169 B2
(45) Date of Patent: Nov. 11, 2014

(54) FIXING SYSTEM FOR THE OPTICAL BLOCK OF A LASER GYROSCOPE

(75) Inventor: André Boura, Chatellerault (FR)

(73) Assignee: Thales, Neuilly-sur-Seine (FR)

(*) Notice: Subject to any disclaimer, the term of this patent is extended or adjusted under 35 U.S.C. 154(b) by 334 days.

(21) Appl. No.: 13/323,666

(22) Filed: Dec. 12, 2011

(65) Prior Publication Data

US 2012/0170045 A1 Jul. 5, 2012

(30) Foreign Application Priority Data

Dec. 31, 2010 (FR) ...................................... 10 05207

(51) Int. Cl.
*G01C 19/64* (2006.01)
*G01C 19/66* (2006.01)

(52) U.S. Cl.
CPC .................................... *G01C 19/661* (2013.01)
USPC ......................................................... 356/459

(58) Field of Classification Search
CPC ....................................................... G02B 7/008
USPC ......................................................... 356/459
See application file for complete search history.

(56) References Cited

U.S. PATENT DOCUMENTS

| 4,890,812 | A | | 1/1990 | Chechile et al. |
| 5,781,355 | A | * | 7/1998 | Meier ........................... 359/871 |
| 5,940,179 | A | | 8/1999 | Jaulain et al. |
| 2010/0089157 | A1 | | 4/2010 | Quer et al. |
| 2010/0199662 | A1 | | 8/2010 | Boura |
| 2011/0205546 | A1 | | 8/2011 | Boura et al. |

FOREIGN PATENT DOCUMENTS

| EP | 0857947 A1 | 8/1998 |
| WO | 99/34236 A2 | 7/1999 |

* cited by examiner

*Primary Examiner* — Tarifur Chowdhury
*Assistant Examiner* — Jonathon Cook
(74) *Attorney, Agent, or Firm* — Baker & Hostetler LLP

(57) ABSTRACT

In a laser gyroscope, an activation wheel has a polygonal cylindrical hub formed by continuous assembly of vertical walls, wherein two adjacent walls of the cylindrical hub between them form a dihedron. Each radial plate of the activation wheel is connected to the cylindrical hub along the edge of a dihedron. The walls are formed with bulging portions, serving for plane-to-plane fixing of one face of the tulip to an optical block, and thin parts allowing a radial displacement degree of freedom of the fixing parts relative to the rim when there is a differential thermal expansion between the tulip and activation wheel. The activation wheel may be produced in a material having a thermal expansion coefficient higher than the tulip, for example steel, with plane-to-plane fixing of the tulip to the activation wheel hub, advantageously by screws, the assembly effectively accommodating the thermal expansion differential between the two materials.

9 Claims, 4 Drawing Sheets

Deformation in double S-shaped feature

Radial deformation due to the expansion
differential between wheel and tulip

FIXING SYSTEM FOR THE OPTICAL BLOCK OF A LASER GYROSCOPE

CROSS-REFERENCE TO RELATED APPLICATION

This application claims priority to foreign French patent application No. FR 1005207, filed on Dec. 31, 2010, the disclosure of which is incorporated by reference in its entirety.

FIELD OF THE INVENTION

The present invention relates to laser gyroscopes and more particularly to a system for fixing the optical block of a laser gyroscope.

BACKGROUND

A laser gyroscope or laser gyro, is an optical movement sensor for measuring the rotation speed of the reference frame of the sensor relative to a Galilean reference frame about one or more axes. Laser gyroscopes are sensors used in inertial measurement units or IMUS. These IMUS are found in inertial control units or sensor units of inertial navigation systems on board certain types of vehicle, such as aircraft.

A laser gyroscope only comprises a one-piece optical block having one or more laser cavities, one cavity per measurement axis, each optical cavity being formed by a polygonal assembly of mirrors on the optical block and a generally gaseous amplifying medium. It also comprises a mechanical activation structure to which the optical block is fixed, said structure serving to generate an alternating rotational movement of the optical block about what is called an activation axis. According to the prior art, this mechanical structure uses an activation wheel comprising an outer part, or rim, a hub in the form of a cylinder of revolution, plane radial plates between the rim and the hub, and a one-part piece called a "tulip" that forms a mechanical link between the optical block and the hub of the activation wheel.

This mechanical structure must provide a mechanical link as rigid as possible with respect to tilting and translational vibration modes of the optical block on the wheel.

To meet this requirement for rigidly fixing the optical block, one technical solution of the prior art is to use two activation wheels that are fixed either side of the optical block, relative to the activation axis, by an associated tulip, and more precisely a thick wheel in the direction of the activation axis but which gives the translational rigidity in this direction, and a thinner wheel in this same direction that prevents the optical block from tilting in a direction perpendicular to the activation axis while still allowing differential expansions to take place reversibly between the internal and external bearing surfaces of the wheels. This technical solution is used notably in the case in which the optical block comprises three measurement cavities (triaxial gyroscope block), taking into account the masses and inertias then involved This mechanical structure must also prevent any relative slip between parts over the temperature range in which the gyroscope is stored and operated, which in the avionic context may extend from −55° C. to +100° C. The operation of a laser gyro optical block is accompanied in fact by a temperature rise of the optical block of around ten to twenty-five degrees above the ambient temperature, whereas the environmental temperature to be taken into consideration in the thermal design of a piece of equipment using a laser gyro typically extends over a range from −15° C. to +70° C. Moreover, in storage, this kind of equipment may undergo larger variations, with temperatures dropping down to −45° C. or even −52° C.

According to the prior art, and taking into account the extent of the temperature range for operating and storing the gyroscope, the parts of the mechanical activation structure (wheels and tulips) are generally made of a material having a very low thermal expansion coefficient over this temperature range for the purpose of minimizing the linking forces due to expansion differentials.

Moreover, it is known that a laser gyro optical block is normally machined from a ceramic having a very low expansion coefficient (typically of the order of $10^{-2}$ ppm/° C.), such as Zerodur™, so as to limit the dimensional variations of the cavity or cavities in optical resonance during its operation. The parts of the mechanical activation structure, which must accommodate the loads due to inertial forces (coming from the activation of the optical block and from the shocks and vibrations of the gyroscope support vehicle) as rigidly as possible, so as to minimize the spurious movements of the optical block, without generating excessive stresses on the optical block during the abovementioned temperature excursions, are therefore advantageously made of a metal alloy having a low expansion, such as Invar™, which is an alloy containing 36% nickel and 64% iron.

Thus, many precision laser gyros used on civil or military aircraft, for purely inertial location purposes, the wheels and the tulips fixed to the optical block (by adhesive bonding or by crimping) are made of Invar™, the expansion coefficient of which is remarkably low over the temperature range to be taken into account.

The mechanical linkage between the wheel hub and the tulip is then advantageously a screw-clamped plane-to-plane linkage, the tangential loads under the screw heads or between the parts, caused by the thermal expansion of these parts, being limited by the homogeneity of the materials. This clamped mechanical linkage has the advantage of enabling the assembly to be easily mounted and removed, thereby facilitating both industrial production and repair. More precisely, the tulip comprises a cylindrical mount, having a plane face which is clamped by screws onto the hub of the activation wheel, which mount is also cylindrical, the other face of the tulip comprising fixing tabs for bonding the optical block.

Although this technical solution is very satisfactory as regards the aspects of mechanical rigidity, reduction in stresses due to expansion differentials and ease of mounting and removal, it does have a major drawback, namely its cost, due to the cost of the material itself—Invar™—and due to the difficulty of machining it.

For less demanding applications in terms of metrological precision of the sensor, other mechanical assemblies have been used that comprise steel wheels between which the optical block is fixed by pinching. However, such a technical solution can be applied only if a lower level of overall precision is accepted, on account of the risks of mechanical instabilities at temperature.

Technical Problem

The technical solutions for assembling the optical block of a gyroscope to its mechanical activation structure are therefore expensive or do not make it possible to achieve the desired metrological precision level over the wide operational and storage temperature range for laser gyros.

The problem addressed is thus how to design a mechanical activation structure employing parts made of an inexpensive material that may have an expansion coefficient differing substantially from that of the material (the ceramic Zerodur™) from which the optical block is made, while still providing a mechanical linkage which is sufficiently rigid and is insensitive to the thermal expansion differentials between the materials over the extent of the operational and storage temperature range of the gyroscope so as to meet the metrological precision requirements of the applications.

The mechanical structure must notably be able to withstand the linkage loads between parts without any risk of slippage or irreversible deformation. More particularly, considering a mechanical structure comprising a tulip machined from Invar™ to which the optical block is bonded, said structure being assembled with a plane-to-plane linkage by screws to the hub of an activation wheel, several types of loads are exerted on the optical block:

local internal loads, at each bonding zone, which are due to the fact that an adhesive joint a few tens of microns in thickness, having an expansion coefficient of around 20 to 100 ppm/° C. and a Young's modulus of the order of 1 GPa, separates two materials having a Young's modulus of the order of 100 GPa, with expansion coefficients of the order of $10^{-2}$ ppm/° C. in the case of one of them and 1 ppm/° C. in the case of the other. These loads are higher the larger the dimensions of the bonding zones (the expansion differential is integrated over the entire area of the bonding zone). Limiting the stresses due to these loads and the associated risk of fracture therefore amounts to limiting the individual dimensions of the bonding zones and more precisely limiting the distance separating the two parts of a bonding zone that are furthest apart;

overall internal loads which depend on the expansion differential between the optical block and the linking parts and above all on the stiffnesses of these parts between the bonding zones (the stiffness of the optical block usually being taken into account as it stands). These loads are limited by controlling the stiffnesses of the parts that provide the linkage between the bonding zones, i.e. between the tulip and the wheel, but this must not result in an excessive reduction in the overall stiffnesses between the bonding zones and the load uptake zones that provide the vibration resistance and serve to activate the optical block; and external loads, due to the inertial forces (generated by the shocks and vibrations imposed on the equipment and by the system for activating the optical block), which are transmitted to the optical block via the linkages between parts (clamping of the tulip onto the wheel and bonding of the tulip to the block). These external loads create stresses at the bonded joints which will be lower, for imposed stresses, when the bonding zones are more numerous, extensive and further apart.

It is difficult to devise an arrangement in which the stresses due to each of these loads are all minimized.

SUMMARY OF THE INVENTION

The invention provides a novel design of the activation wheel and notably a novel design of the hub of the activation wheel, making it possible for the wheel to be made of steel, a less expensive material, but having a higher thermal expansion coefficient than Invar™. According to the invention, a hub is not made in the form of a cylinder of revolution, rather what is made is a basically polygonal faceted hub formed from several plane walls, having thicker parts serving for plane-to-plane fixing of the tulip and thin parts permitting a radial displacement degree of freedom.

The invention therefore relates to an optical gyroscope comprising an optical block fixed by bonding to fixing pads of a one-part piece called a tulip, and a one-part activation wheel made of a material having a thermal expansion coefficient different from that of the tulip, the activation wheel comprising an outer rim and an axially symmetric cylindrical inner hub connected to the rim by plane radial plates that are distributed around the hub, characterized in that the cylindrical hub is formed by a continuous assembly of several plane walls distributed about the axis of the cylindrical hub and parallel to this axis, such that two adjacent walls of the cylindrical hub together form a dihedron, with a radial plate of the activation wheel connected to the cylindrical means along the edge of this dihedron, each wall comprising at least one bulging portion and one thinned portion, the bulging portion serving for the plane-to-plane fixing of one face of the tulip and the thinned portion allowing a radial displacement degree of freedom of the fixing part relative to the rim when there is a differential thermal expansion between the tulip and the activation wheel.

According to one embodiment, the bulging portions are advantageously located at the mid-points of the walls and divide these walls into two thin coplanar plane half-plates, the radial displacement where there is a differential thermal expansion takes place by the thin plane half-plates flexing in a radial direction.

According to another embodiment, the thin parts of the walls are hinges having axes parallel to the axis of the wheel, these being machined in the cylindrical hub, and the bulging portion of each wall is connected to a radial plate of the activation wheel by two hinges, the radial displacement when there is a differential thermal expansion taking place by rotation about the two hinges. Advantageously, the bulging portions are located at the mid-points of the walls and divide these walls into two coplanar half-plates, each half-plate of a wall comprising a hinge between the bulging portion of the wall and the half-plate and a hinge between the half-plate and a plane radial plate of the activation wheel.

BRIEF DESCRIPTION OF THE DRAWINGS

Other features and advantages of the invention are explained in detail in the following description of embodiments of the invention and with reference to the appended drawings in which.

DETAILED DESCRIPTION

Figure 1:
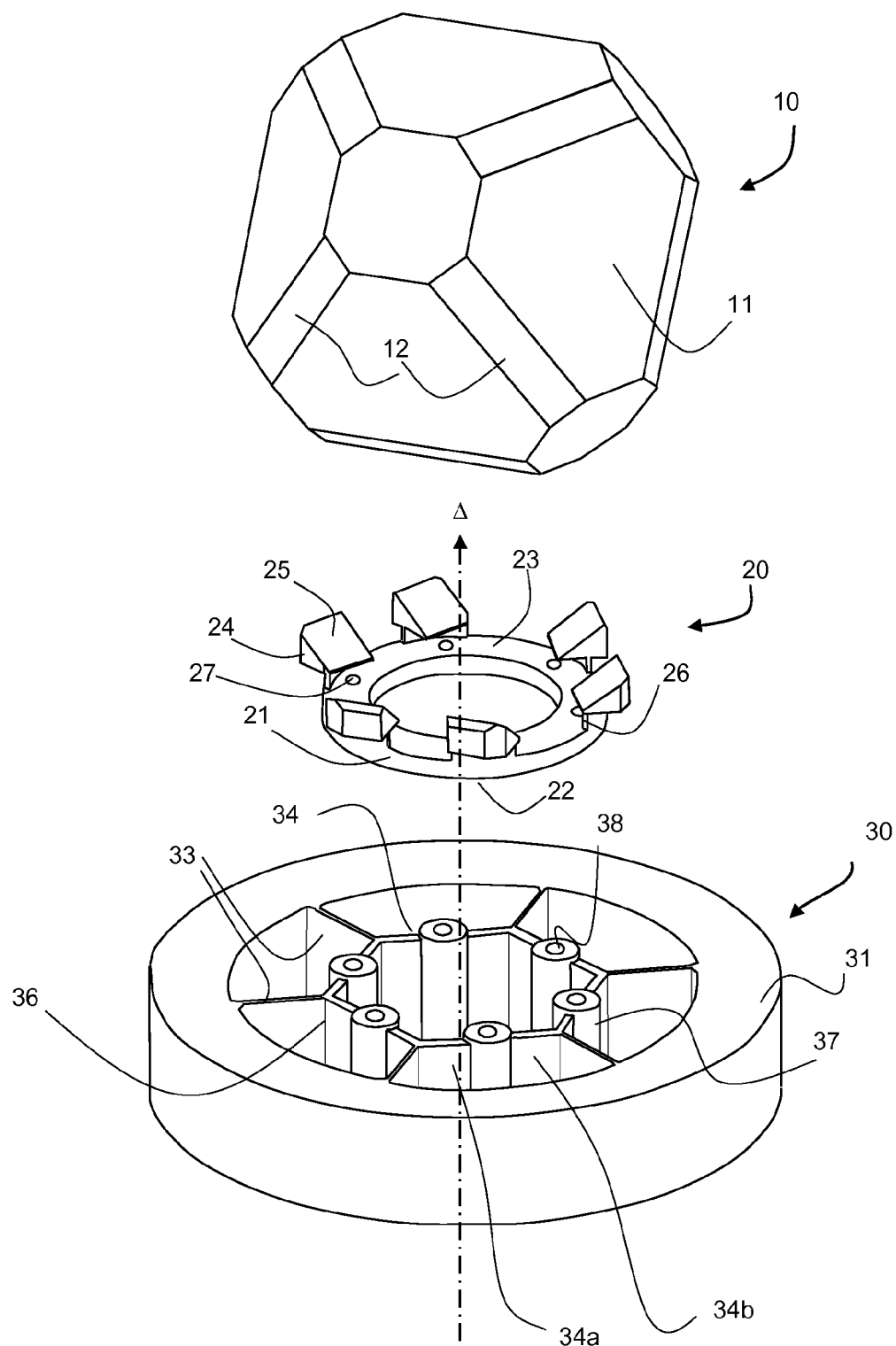
FIG. 1 is an exploded view of a mechanical activation structure for the optical block of a laser gyro according to the invention.
Figure 2:
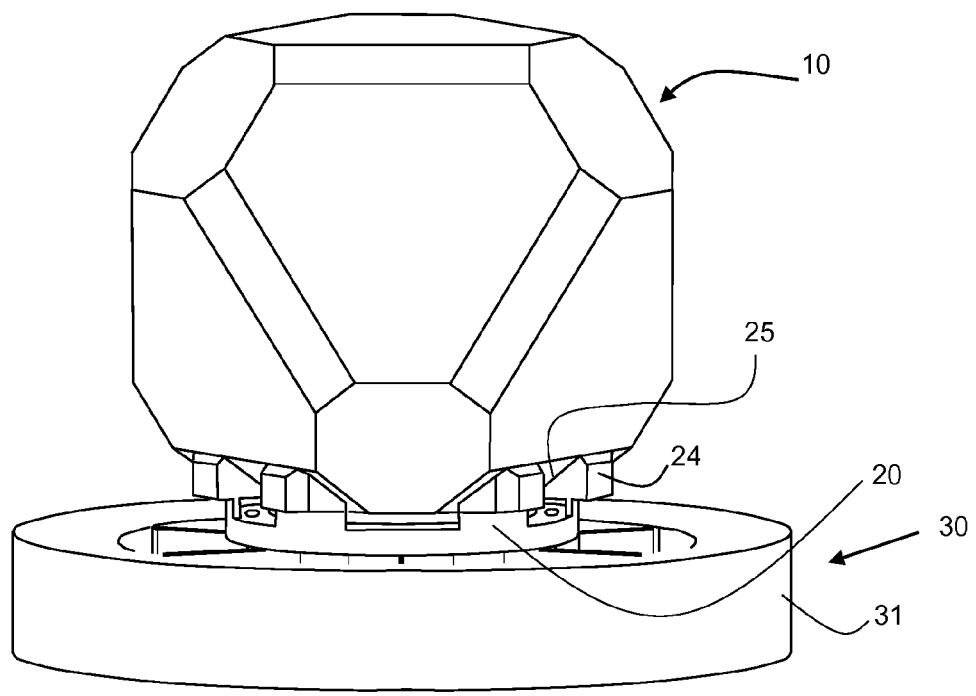
FIG. 2 is a view of the optical block assembled on the mechanical structure of FIG. 1.

FIG. 1 is an exploded view of a laser gyroscope according to the invention, comprising the optical block 10 of the gyroscope, an activation wheel 30 of axis Δ, vertical in the figure, and a part 20 called a "tulip" forming the mechanical linkage between the optical block and the wheel. FIG. 2 shows a front view of the gyroscope after optical block/tulip/activation wheel assembly along the axis Δ. The assembly thus formed makes it possible to generate an alternating rotational movement of the optical block about the axis Δ of the wheel, called the activation axis.

The optical block 10 takes the form of a regular polyhedron having bevelled edges 12 (or cut faces)—in the example, an octahedron having eight substantially triangular faces 11 as illustrated schematically in FIG. 1. Such an optical block is well known to have three resonant optical cavities as described for example in the patent EP 0 857 947, to which the reader may refer for the details of an embodiment of a laser-cavity gyroscope. The optical block is of the one-part type made of a material having a very low thermal expansion, such as Zerodur™, which is machined. The mirrors and other peripheral parts of the gyroscope have not been shown, as these are not the subject of the invention.

The tulip 20 is designed to be rigid in all directions, while still permitting a slight thermal expansion. It is thus produced in one-part form in a material having a thermal expansion coefficient as low as possible, typically made of Invar™, or made of Zerodur™.

The tulip is formed from a ring-shaped cylindrical mount 21. The bottom face 22 of the mount is plane and orthogonal to the axis Δ of the wheel. This face is intended to be assembled on the hub of the activation wheel 30 in a plane-to-plane linkage in a plane orthogonal to the axis of the wheel. The top face 23 of the mount has fixing tabs 24 with faces 25 provided for bonding the optical block. Each tab is formed with a part 26 acting as a hinge, linking the bonding face 25 to the cylindrical mount. These hinges 26 are oriented so as to be tangential to the mount. They allow the optical block and the tulip to expand at temperature in the radial direction R while generating only limited loads, while still guaranteeing a very high rotational stiffness of the block relative to the cylindrical mount. In one practical embodiment, the tulip is inscribed within a cylinder 58 mm in diameter and 12 mm in height, with bonding face 25 each having an area of the order of 100 mm². These small dimensions help to limit the cost of this mechanical linkage piece.

As illustrated in FIG. 2, the optical block is bonded to the bonding faces 25 of the tulip, along the three chamfered edges 12 of one of the triangular faces 11 thereof. The bonding fixes the relative positioning and orientation of the two parts, namely the optical block and the tulip.

In the example illustrated, the optical block is thus bonded in six zones—two zones per edge—corresponding to two fastening tabs 24 of the tulip, the latter having six such tabs.

The activation wheel is made of a steel material, which is less expensive than the material of the optical block or the tulip. This material has a higher thermal expansion coefficient than the material of the tulip. Typically, it is made of a steel having an expansion coefficient of the order of 10 ppm/° C. To accommodate the thermal expansion differential between the tulip and the activation wheel, which are made of materials having different expansion coefficients, the wheel has a novel architecture, which will now be presented. This architecture of the wheel allows the assembled parts to expand at temperature without generating excessively large internal loads that could cause relative slip of the tulip with respect to the wheel, while still ensuring that the optical block/tulip assembly has a very high rotational stiffness with respect to the hub of the wheel.

Figure 3:
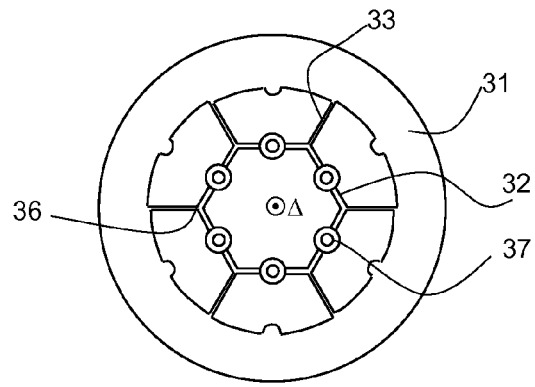
FIG. 3 is a top view of the activation wheel according to one embodiment of the invention.

In the illustrations of FIGS. 1 to 3, the axis Δ of the activation wheel is vertical. The activation wheel 30 of axis Δ comprises:

an outer rim 31 of axis Δ;

an inner hub 32, an axially symmetric hollow cylinder, of axis Δ; and plane radial plates 33 directed along the axis Δ, i.e. vertical plates in the figures, which are distributed around the hub and connect the outer rim to the inner hub.

According to the invention, the cylindrical hub 32 of axis Δ is formed by a continuous assembly of several plane walls 34, or facets, distributed around the axis Δ of the cylinder and parallel to this axis. Two adjacent walls of the hub thus form a dihedron, the edge 36 of which is parallel to the axis Δ of the cylinder. The hub thus has a polygonal—hexagonal—base having vertical walls 34 in the example illustrated in the figures.

The plane radial plates 33 of the wheel thus each bear on the hub, to which they are linked, along the edge 36 of the dihedron formed by two adjacent walls of the hub. Thus, there are as many plane radial plates as there are plane walls or facets of the hub. In the example of a basically hexagonal hub illustrated, there are six of each.

The walls 34 of the hub each comprise a bulging portion 37 separating each wall into two thin coplanar half-plates 34a and 34b.

The bulging portions of the walls serve for the plane-to-plane fixing of the plane face of the tulip.

More precisely, the bulging portions 37 of the walls of the hub have an end 37a in one and the same plane perpendicular to the axis Δ for plane-to-plane fixing to the bottom face 22 of the mount of the tulip. Preferably, these ends 37a are longer (taller) along the axis Δ of the cylinder than the half-plates of the walls, as illustrated in FIG. 1. In this way, when the face 22 of the mount of the tulip is assembled to the hub, it does not touch the walls of the hub, which are away from these ends 37a.

The bulging portions 37 of the hub are advantageously pierced by holes along the axis of the cylinder, allowing the insertion of a screw for fixing the tulip to the hub (the ring-shaped mount 21 of the tulip having corresponding holes 27). The mount 21 of the tulip 20 may thus be screwed via its face 22 onto the hub of the activation wheel 30 at each bulging portion 37.

Preferably, and as illustrated, the bulging portions 37 are in the form of a cylinder having an axis parallel to the axis Δ, their ends 37a offering a disc-shaped fixing surface.

These bulging portions 37 are placed at the mid-points of the walls, separating each wall 34 into two thin coplanar half-plates 34a and 34b. Each half-plate of a wall thus extends between the bulging portion 37 of this wall and a plane radial plate 33, at the edge 36 of the dihedron formed with an adjacent wall. Each bulging portion 37 of a wall 34 of the hub is thus joined to two plane radial plates 33 of the activation wheel via the thin plane half-plates 34a and 34b of this wall.

Figure 5:
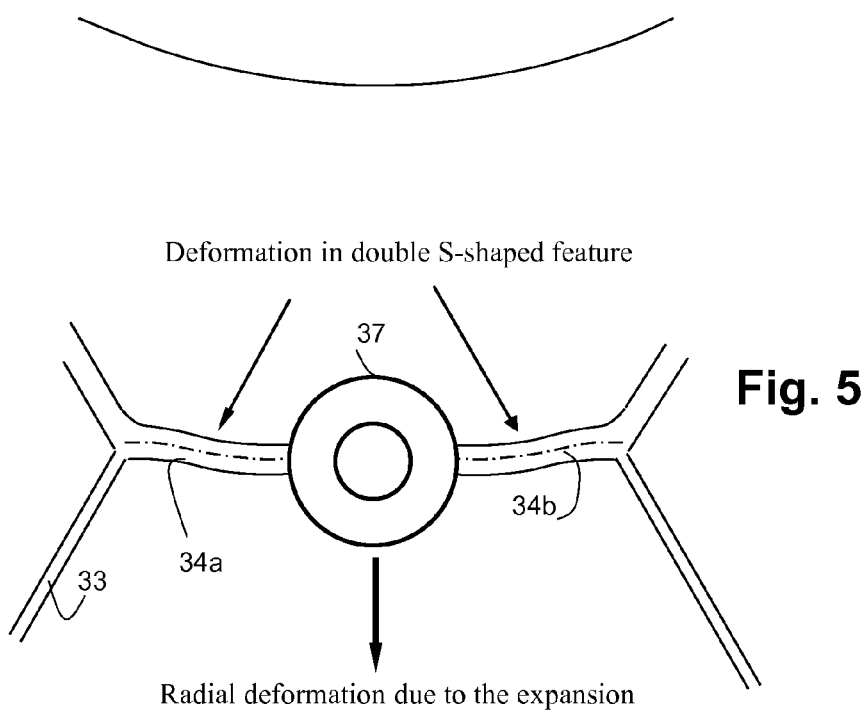
FIG. 5 illustrates the S-shaped flexure of the thin parts of the walls according to the invention, making it possible to absorb a thermal expansion differential between the tulip and the activation wheel.

These thin coplanar half-plates 34a and 34b form thinned portions of the wall relative to the bulging portion 37 that serves for fixing the tulip. These thin deformable half-plates, on either side of the thicker part 37 of each wall, permit a radial displacement degree of freedom of the bulging portion 37 relative to the rim 31 of the activation wheel when there is a differential thermal expansion between the tulip and the activation wheel. More precisely, the thin half-plates allow the structure to accommodate an expansion differential by a double S-shaped flexure effect in the radial direction, on either side of the fixing zone 37 of the tulip, as illustrated schematically in FIG. 5. This accommodation makes it possible, on the one hand, to limit the risk of fracture at the bonded joint between the tulip and the optical block and, on the other hand, to limit the risk of slip between the hub of the wheel and the tulip, while still allowing these linkages to ensure the necessary stiffness with respect to tilting of the optical block relative to the wheel.

In the other directions, these half-plates essentially work in compression and in shear.

In a practical example, the thin plane half-plates may have a thickness of around 1.5 to 2 mm, whereas the cylindrical bulging portions 37 serving for plane-to-plane fixing of the tulip will be thicker, with a cylinder diameter of around 8 mm.

Figure 6:
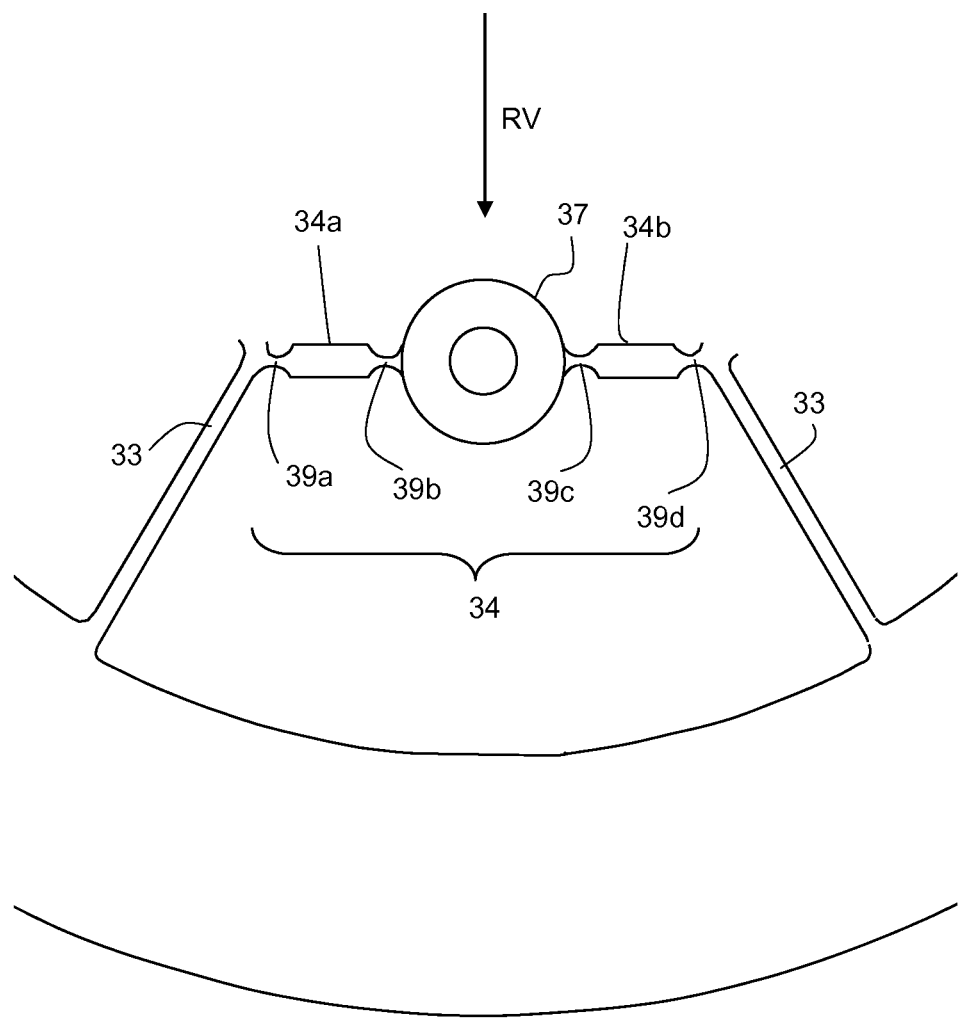
FIG. 6 illustrates another embodiment of the invention.

Another embodiment of the invention is illustrated in FIG. 6, which is an embodiment variant of the thin parts of the walls of the hub, which permit a radial displacement degree of freedom of the bulging portion 37 relative to the rim 31 of the activation wheel when there is a differential thermal expansion between the tulip and the activation wheel. In this variant, the thin parts of the walls are hinges machined in each coplanar half-plate.

More precisely, in this embodiment, the two coplanar half-plates 34a and 34b on each side of the fixing zone 37 each comprise two hinges of vertical axis that are machined in the cylindrical hub, namely a hinge (39a, 39b) which connects a half-plate (34a, 34b) to the thick part 37 of the wall and a hinge (39b, 39c) which connects the half-plate (34a, 34b) to a plane radial plate 33. In this arrangement, each wall of the hub thus comprises four hinges of vertical axis, which are aligned so as to be perpendicular to the radius vector RV going from the axis Δ of the wheel to the bulging portion 37 of the wall. The bulging portion 37 of each wall is thus connected to a radial plate of the activation wheel 33 by two hinges, such as 39a and 39b, the radial displacement when there is a differential thermal expansion taking place by rotation about the two hinges.

The hinges form thin parts of the walls, obtained by machining the cylindrical hub, i.e. thin relative to the thicker bulging portions 37 serving for the plane-to-plane fixing of the tulip. Between the two hinges 39a, 39b and 39c, 39d respectively of each half-plate 34a, 34b respectively, the thickness of the wall may be variable, for example thicker than the hinges. Preferably, these parts of the half-plates between the hinges will be less thick than or as thick as the bulging portion 37.

When there is a differential thermal expansion between the tulip (made of Invar™) and the hub (made of steel) of the wheel, the radial displacement due to an expansion differential between the tulip and the hub then takes place by a small rotation about the two hinges on each side of the fixing zone 37 of the tulip.

The relative thicknesses of the hinges, the parts of the half-plates away from the hinges and the bulging portions for fixing the tulip will in practice be chosen in order to ensure that the function of accommodating the thermal expansion differential is effectively provided, while minimizing the volume of material needed to manufacture the hub.

In one example, the thinned machined zone forming a hinge may have a thickness of around 0.5 to 1 mm and the typically cylindrical bulging zones 37 may have a diameter of around 2 to 3 mm.

Figure 4:
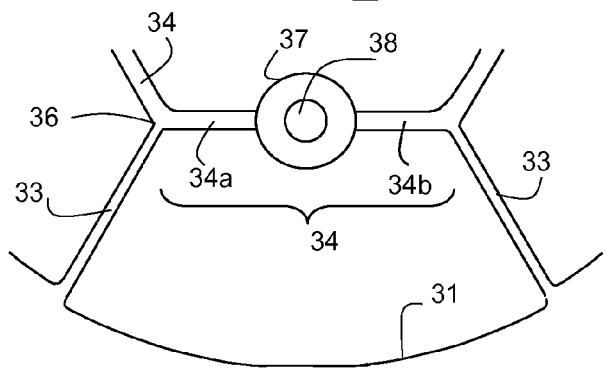
FIG. 4 is a detail of FIG. 3, showing the arrangement of the walls of the hub and the radial plates of the activation wheel.

The invention illustrated by the two embodiments that have just been described makes it possible, by virtue of the wheel architecture with a faceted hub, for the plane radial plates to bear on the hub at the edges between the facets, formed from plane walls perpendicular to the radial direction of the loads due to the differential expansions. These plane walls have a bulging portion at the mid-point of the wall, serving for the plane-to-plane fixing of a plane face of the tulip, and, on either side of this bulging portion, at least one thinned portion that deforms in flexure (FIGS. 4 and 5) or in rotation (FIG. 6). Such an arrangement provides a directed flexibility, limiting the linkage loads between the hub of the wheel and the tulip bonded to the optical block.

This novel wheel architecture, with a faceted hub, makes it possible to minimize the radial loads due to the expansion differential that exists between the tulip and the hub of the wheel. The wheel may therefore be produced from a variety of materials less expensive than Invar™ and makes it possible to maintain the principle of screw-clamp plane-to-plane linkage. The reduction in thermal loads also makes it possible to envisage using less expensive and fewer screws for removably connecting the hub of the wheel to the tulip.

In the examples illustrated in the figures, it will be noted that the rim 31 of the activation wheel has a simple ring shape. It should be noted that there are more complex shapes, designed to increase the stiffness of the wheel in deformation modes for which the optical block tends to move translationally in the direction of the axis Δ of the wheel, notably a double-ring shape with a sleeve for linking them. The invention applies to all these rim shapes of the activation wheel.

All other things (materials, wall thicknesses, wheel height, wheel radial plate length, etc.) being the same, it has been confirmed that, with a hub according to the invention, connecting the fixing points of the tulip via a six-faceted structure as illustrated in the figures, the radial thermal loads imposed on an Invar™ tulip are reduced by 40% relative to a conventional hub using the geometry of a cylinder of revolution. It has also been confirmed that the stiffnesses of the optical block/tulip/wheel assembly with respect to lateral tilting and translation of the optical block relative to the outside of the wheel are at least as high as those obtained with a hub having a geometry in the form of a cylinder of revolution. The invention is not limited to a six-faceted structure as shown, even though the advantage obtained in respect of accommodating the expansion differential between the wheel and the tulip decreases with the number of facets.

Advantageously, the invention makes it possible to produce a laser gyroscope with an activation wheel (i.e. the outer rim, the inner hub and the radial plates) made of steel.

The invention claimed is:

1. An optical gyroscope, comprising:
an optical block fixed by bonding to fixing pads provided on a face of a one-part ring shape piece called a tulip, and
a one-part activation wheel made of a material having a thermal expansion coefficient higher from that of the tulip, the activation wheel comprising an outer rim and an axially symmetric cylindrical inner hub, connected to the outer rim by plane radial plates that are distributed around the hub,
wherein the cylindrical hub is a faceted hub structure formed by a continuous assembly of several plane walls distributed about the axis of the cylinder and parallel to this axis, such that each of two adjacent walls of the cylindrical hub together form a dihedron, and a corresponding radial plate of the activation wheel is connected to the cylindrical means along the edge of this dihedron, each wall of the hub comprising at least one bulging portion and one thinned portion, each of the bulging portions of the hub offering a disc-shape fixing part serving for the plane-to-plane fixing of another face of the tulip and the thinned portions allowing a radial displacement degree of freedom of the fixing part relative to the rim when there is a differential thermal expansion between the tulip and the activation wheel, while keeping translation and tilting stiffness of the optical block/tulip assembly with respect to the rim of the dithering wheel.

2. An optical gyroscope according to claim 1, in which the bulging portions are located at the mid-points of the walls and divide these walls into two thin coplanar plane half-plates, the radial displacement where there is a differential thermal expansion takes place by the thin plane half-plates flexing in a radial direction.

3. An optical gyroscope according to claim 1, in which the thin parts of the walls are hinges having axes parallel to the axis of the cylindrical hub, these being machined in the cylindrical hub, and the bulging portion of a wall is connected to a radial plate of the activation wheel by two hinges, the radial displacement when there is a differential thermal expansion taking place by rotation about the two hinges.

4. An optical gyroscope according to claim 3, in which the bulging portions are located at the mid-points of the walls and divide these walls into two coplanar half-plates, each half-plate of a wall comprising a hinge between the bulging portion of the wall and each half-plate and a hinge between the half-plate and a plane radial plate of the activation wheel.

5. An optical gyroscope according to claim 1, in which the bulging portions are drilled with holes for inserting a screw for fixing the tulip to the hub.

6. An optical gyroscope according to claim 1, in which the bulging portions have a fixing end which is higher than the other parts of the walls so that the tulip is in contact with the hub only via said bulging portions.

7. An optical gyroscope according to claim 1, in which the activation wheel, including the hub, is made of steel and the tulip is made of Invar™ or Zerodur™.

8. An optical gyroscope according to claim 1, in which the hub is basically hexagonal.

9. An optical gyroscope according to claim 1, in which the activation wheel, including the hub, is made of steel and the tulip is made of:
- a metal alloy containing 36% nickel and 64% iron, or
- a ceramic having an expansion coefficient on the order of $10^{-2}$ ppm/° C.

* * * * *